(12) United States Patent
Konishi et al.

(10) Patent No.: US 6,649,693 B2
(45) Date of Patent: Nov. 18, 2003

(54) POLYURETHANE AND WATER-COMPATIBLE POLYURETHANE RESIN

(75) Inventors: Shohei Konishi, Tokyo (JP); Shigeru Murata, Suzuka (JP); Toshio Yamauchi, Yokkaichi (JP)

(73) Assignee: Kyowa Yuka Co., Ltd., Tokyo (JP)

( * ) Notice: Subject to any disclaimer, the term of this patent is extended or adjusted under 35 U.S.C. 154(b) by 0 days.

(21) Appl. No.: 10/182,408

(22) PCT Filed: Feb. 2, 2001

(86) PCT No.: PCT/JP01/00760

§ 371 (c)(1),
(2), (4) Date: Nov. 14, 2002

(87) PCT Pub. No.: WO01/57108

PCT Pub. Date: Aug. 9, 2001

(65) Prior Publication Data

US 2003/0139560 A1 Jul. 24, 2003

(30) Foreign Application Priority Data

Feb. 4, 2000 (JP) .......................................... 2000-026947

(51) Int. Cl.⁷ ............................. C08J 3/03; C08G 18/32; C08L 75/04; C09D 175/04; C09J 175/04
(52) U.S. Cl. ...................... 524/840; 524/591; 524/839; 528/71; 528/905; 528/85
(58) Field of Search ............................. 528/71, 905, 85; 524/591, 839, 840

(56) References Cited

U.S. PATENT DOCUMENTS

| | | | |
|---|---|---|---|
| 5,662,966 A | 9/1997 | Kobayashi | 427/385.5 |
| 5,952,437 A | 9/1999 | Tadokoro et al. | 525/440 |
| 6,087,466 A | 7/2000 | Murata et al. | 528/83 |
| 6,143,840 A * | 11/2000 | Murata et al. | 525/443 |
| 6,353,078 B1 * | 3/2002 | Murata et al. | 528/83 |
| 6,569,533 B1 * | 5/2003 | Uchida et al. | 428/423.1 |

FOREIGN PATENT DOCUMENTS

| | | | |
|---|---|---|---|
| EP | 0 523 709 A1 | | 7/1992 |
| EP | 1 000 994 | | 5/2000 |
| JP | 11-322876 | * | 11/1999 |
| JP | 2000-327759 | | 11/2000 |
| JP | 2000-26782 | | 12/2000 |
| WO | 98/27133 | * | 6/1998 |
| WO | 02/32981 | * | 4/2002 |

OTHER PUBLICATIONS

Furukawa, et al., "Mechanical Properties and Hydrolytic Stability of . . . ", Polymer, vol. 40 (1999), pp. 1791–1798.

* cited by examiner

Primary Examiner—Rabon Sergent
(74) Attorney, Agent, or Firm—Fitzpatrick, Cella, Harper & Scinto

(57) ABSTRACT

The present invention provides a polyurethane exhibiting a superior adhesive property, bonding property, weather resistance, water resistance, and the like, and comprising in a molecule: an acidic group which is neutralized by a basic compound; and a structural unit represented by general formula (I):

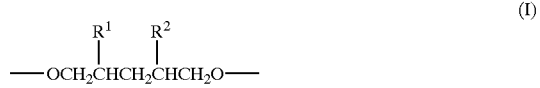

(in the formula, $R^1$ and $R^2$ are identical or different, and represent a lower alkyl group).

8 Claims, No Drawings

POLYURETHANE AND WATER-COMPATIBLE POLYURETHANE RESIN

TECHNICAL FIELD

The present invention relates to aqueous polyurethane resins exhibiting a superior adhesive property, bonding property, weather resistance, water resistance, and the like, and polyurethanes for use in these resins.

BACKGROUND ART

Aqueous polyurethane resins are widely employed as resins for use in coating materials, adhesives, binders, inks, or the like since they exhibit superior dynamically physical properties, abrasion resistance, flexibility, and the like. In particular, there is a recent trend for restricting the discharge of organic solvents to the atmosphere in view of the environmental protection of the earth, and for this reason, in the future, applications of aqueous polyurethane resins may be broadened in various uses.

As aqueous polyurethane resins, those prepared from a diol having an acidic group such as dimethylol propionic acid, dimethylol butanoic acid, or the like as a raw material, and the acidic group of which is neutralized by a base are known (Japanese Examined Patent Application, Second Publication No. Sho 61-5485, Japanese Examined Patent Application, Second Publication No. Hei 4-488, Japanese Unexamined Patent Application, First Publication No. Hei 8-27242, and Japanese Unexamined Patent Application, First Publication No. Hei 6-329744).

For the case where aqueous polyurethane resins are employed for use in coating materials, adhesives, or the like, they are required to exhibit characteristics of maintaining physical properties for a long period of time, such as weather resistance, water resistance, and the like, as well as to exhibit a superior adhesive property and bonding property. However, the aqueous polyurethane resins disclosed in the publications described above cannot practically meet the performance requirements.

In addition, WO96/09334 discloses polyurethanes employing 2,4-diethyl-1,5-pentanediol. The polyurethanes disclosed in the Examples of said publication cannot form an aqueous polyurethane resin due to their low solubility in water or the like.

DISCLOSURE OF THE INVENTION

An object of the present invention is to provide an aqueous polyurethane resins exhibiting a superior adhesive property, bonding property, weather resistance, water resistance, and the like, and to provide polyurethanes employed in said resins.

That is, the present invention provides polyurethanes comprising in a molecule: an acidic group which is neutralized by a basic compound; and a structural unit represented by general formula (I):

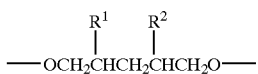

(in the formula, $R^1$ and $R^2$ are identical or different, and represent a lower alkyl group).

In addition, the present invention provides an aqueous polyurethane resins comprising said polyurethane.

In the definition of the groups of general formula (I), examples of the lower alkyl groups include straight or branched alkyl groups having 1 to 8 carbon atoms, such as a methyl group, an ethyl group, a propyl group, an isopropyl group, a butyl group, an isobutyl group, a sec-butyl group, a tert-butyl group, a pentyl group, an isoamyl group, a neopentyl group, a 2-pentyl group, a 3-pentyl group, a hexyl group, a heptyl group, an octyl group, and the like.

In addition, examples of the acidic groups include a carboxyl group, a sulfo group, a phosphono group, and the like. Among these, a carboxyl group is preferable.

Examples of the basic compounds for neutralizing the acidic group include the basic compounds described below.

The polyurethanes of the present invention can be synthesized according to known methods (Japanese Unexamined Patent Application, First Publication No. Hei 8-27242, Japanese Unexamined Patent Application, First Publication No. Hei 8-259884, or the like).

One example of the methods for preparing a polyurethane of the present invention is explained in (1) to (3) below.

(1) Preparation of a polyester polyol: 2,4-Dialkyl-1,5-pentanediol which is a diol comprising a structural unit in a molecule, the unit represented by general formula (I), is reacted with a dicarboxylic acid to produce a polyester polyol.

(2) Preparation of a urethane prepolymer and neutralization of the same: The above polyester polyol, a compound having an acidic group, and a polyisocyanate are reacted to produce a urethane prepolymer having an isocyanate group at the terminal. Then, the acidic group of the above urethane prepolymer is neutralized by a basic compound.

(3) Preparation of a polyurethane: The above urethane prepolymer, wherein the acidic group is neutralized, is reacted with a chain-elongation agent to produce a polyurethane according to the present invention.

In the following, steps (1) to (3) are explained in more detail.

(1) Preparation of the Polyester Polyol:

A polyester polyol can be obtained from 2,4-dialkyl-1,5-pentanediol and a dicarboxylic acid according to a known method (such as that described in Japanese Unexamined Patent Application, First Publication No. Sho 48-101496, WO98/44014, WO99/06498, or the like) by, for example, heating them, or heating them under reduced pressure, followed by dehydration polycondensation.

Examples of the dicarboxylic acids include succinic acid, adipic acid, azelaic acid, sebacic acid, maleic acid, fumaric acid, phthalic acid, and the like. They can be employed alone or in combination with two or more of the same. In addition, instead of the dicarboxylic acid, an acid anhydride of the dicarboxylic acid or a lower alkyl ester of the dicarboxylic acid, such as a methyl ester, an ethyl ester, or the like, may be employed.

2,4-Dialkyl-1,5-pentanediol can be prepared according to a method described in WO97/19904, or alternatively is commercially available.

Furthermore, in addition to 2,4-dialkyl-1,5-pentanediol, other diols may be simultaneously employed. In this case, the ratio of 2,4-dialkyl-1,5-pentanediol to the total of the diols is preferably 30% by weight or more, and more preferably is 40% by weight or more.

Examples of the other diols which can be simultaneously employed include ethylene glycol, propylene glycol, 1,4-butanediol, diethylene glycol, 1,6-hexanediol, 2-butyl-2-ethyl-1,3-propanediol, 3-methyl-1,5-pentanediol, 1,4-bis(β-hydroxyethoxy)benzene, and the like. In the case of employing these other diols, a random polycondensation may be carried out.

The molar ratio of the diol with respect to the dicarboxylic acid in the raw materials is not particularly restricted. It preferably ranges from 1.0 to 2.0, and more preferably ranges from 1.1 to 1.5.

The temperature during production of the polyester polyol is not particularly restricted. It preferably ranges from 100 to 300° C., and more preferably ranges from 150 to 250° C.

The number average molecular weight of the polyester polyol preferably ranges from 400 to 8,000, and more preferably ranges from 600 to 5,000.

In addition, it is preferable that the polyester polyol be produced without employing solvents. However, solvents which are inert with respect to the reaction may be employed, and for example, ketones such as methyl ethyl ketone, methyl isobutyl ketone, or the like, ethers such as tetrahydrofuran or the like, aromatic hydrocarbons such as benzene, toluene, xylene, or the like may be employed.

(2) Preparation of the Urethane Prepolymer and Neutralization of the Same:

As a raw material for a urethane prepolymer, a mixture produced by mixing, in a polyester polyol which is a raw material for the urethane prepolymer, other kinds of polyols such as a polycarbonate polyol, a polyether polyol, or the like may be employed. In this case, the ratio of the polyester polyol employed to the total of the polyols is preferably from 50% by weight or more, and more preferably is from 70% by weight or more.

Examples of the compounds having an acidic group include compounds which have an acidic group such as a carboxyl group, a sulfonic group, a phosphono group, or the like, and preferably have a carboxyl group, in a molecule, and have two or more groups having an activated hydrogen capable of reacting with an isocyanate group, such as a hydroxyl group or the like in a molecule.

Thus, examples of the compounds having an acidic group include dimethylol alkanoic acids such as dimethylol propionic acid, dimethylol butanoic acid, dimethylol pentanoic acid, dimethylol heptanoic acid, dimethylol octanoic acid, and the like, N,N-bis(2-hydroxyethyl)-2-aminoethanesulfonic acid, reaction products of sulfoisophthalic acid and a multi-functional hydroxy compound, a reaction product of 2,3-epoxypropanol and mono-2-ethylhexyl phosphate, 2,3-dihydroxypropyloctyl phosphate, and the like. Among these, dimethylol alkanoic acids such as dimethylol propionic acid, dimethylol butanoic acid, dimethylol pentanoic acid, dimethylol heptanoic acid, dimethylol octanoic acid, and the like are preferable.

Compounds having an acidic group are preferably employed so that the acid value of the polyurethane which is the final desired product ranges from 0.1 to 100 mg KOH/g, and more preferably so that it ranges from 5 to 40 mg KOH/g.

Examples of the polyisocyanates include compounds having two or more isocyanate groups, for example, aromatic diisocyanates such as diphenylmethane diisocyanate, 2,4-tolylene diisocyanate, 2,6-tolylene diisocyanate, p-phenylene diisocyanate, m-phenylene diisocyanate, 2,4-naphthalene diisocyanate, 1,5-naphthalene diisocyanate, p-xylylene diisocyanate, and the like; alicyclic diisocyanates such as isophorone diisocyanate, 4,4'-diisocyanate dicyclohexane, 4,4'-diisocyanate dicyclohexylmethane, and the like; aliphatic diisocyanates such as hexamethylene diisocyanate, tetramethylene diisocyanate, and the like; and so on. They may be employed alone or in combination with two or more of the same.

Polyisocyanates are preferably employed so that the molar ratio of an isocyanate group to a hydroxyl group in the raw materials ranges from 1.1 to 10.0, and more preferably so that the ratio ranges from 1.5 to 5.0.

The reaction temperature in the urethane forming reaction preferably ranges from 20 to 150° C., and more preferably ranges from 40 to 120° C.

In addition, the urethane forming reaction maybe carried out without employing reaction solvents. It may also be carried out in a reaction solvent such as methyl ethyl ketone, methyl isobutyl ketone, tetrahydrofuran, 1,4-dioxane, ethyl acetate, toluene, xylene, acetone, dimethylformamide, or the like, if necessary.

In addition, during the urethane forming reaction, an organometallic catalyst such as tin octylate or the like or a urethane forming catalyst, for example, a tertiary amine such as triethylene diamine or the like maybe employed, if necessary. The amount of the catalyst is in a range of 0.05 to 5% by weight with respect to the reaction mixture.

The neutralization of the acidic group in the urethane prepolymer using a basic compound can be carried out by adding the basic compound to the urethane prepolymer. Furthermore, commonly, water is added to the neutralized urethane prepolymer to dissolve or disperse the urethane prepolymer in water. Alternatively, water can be added to the urethane prepolymer, followed by neutralization. However, it is preferable that water be added to the neutralized urethane prepolymer.

The basic compounds for use in neutralization are preferably employed in an amount of 0.5 to 1.5 equivalents with respect to the acid groups in the urethane prepolymer, and more preferably in an amount of 0.8 to 1.2 equivalents.

In addition, as the basic compounds, any compounds capable of neutralizing the acidic group and forming a salt can be employed. Examples of the basic compounds include ammonia, organic amines such as triethylamine, ethylene diamine, propylamine, dibutylamine, amylamine, 1-aminooctane, 2-dimethylaminoethanol, ethylaminoethanol, 2-diethylaminoethanol, 1-amino-2-propanol, 2-amino-1-propanol, 3-amino-1-propanol, 1-dimethylamino-2-propanol, 3-dimethylamino-1-propanol, 2-propylaminoethanol, ethoxypropylamine, aminobenzyl alcohol, morpholine, and the like, hydroxides or carbonates of an alkali metal or an alkaline earth metal, such as sodium hydroxide, potassium hydroxide, sodium carbonate, potassium carbonate, and the like. Among these, organic amines are preferably employed.

After neutralization by using the basic compound, the urethane prepolymer may be emulsified, if necessary. In this case, an emulsifier may be employed in an amount of 0.1 to 5 parts by weight with respect to the urethane prepolymer. Examples of the emulsifiers include anionic surfactants, nonionic surfactants, polymer emulsifiers, and the like. Examples of the anionic surfactants include higher alcohol sulfates, alkyl benzene sulfates, polyoxyethylene alkyl sulfates, polyoxyethylene alkyl phenol ether sulfates, and the like. Examples of the nonionic surfactants include polyoxyethylene alkyl phenol ethers, ethylene oxide propylene oxide block polymers, sorbitan derivatives, and the like. In addition, examples of the polymer emulsifiers include a polyvinyl alcohol, hydroxyethylcellulose, and the like.

(3) Preparation of the Polyurethane:

In order to make the urethane prepolymer into the polymer with a high molecular weight, the prepolymer is subjected to a reaction with a chain-elongation agent, thus producing a polyurethane according to the present invention. As the chain-elongation agent in this case, diamines, polyols, alkanolamines, hydrazine, or the like, having a low molecular weight, are employed.

Examples of the diamines include ethylenediamine, propylenediamine, tetramethylenediamine, hexamethylenediamine, isophoronediamine, 1,4-cyclohexanediamine, and the like.

Examples of the polyols include ethylene glycol, propylene glycol, 1,4-butanediol, 1,5-pentanediol, 1,6-hexanediol, hydroquinone, and the like.

Examples of the alkanolamines include diethanolamine, triethanolamine, and the like.

The chain-elongation agents are preferably employed so that the molar ratio of the isocyanate groups in the urethane prepolymer to the hydroxyl groups or amino groups in the chain-elongation agent ranges from 0.1 to 10, and more preferably so that it ranges from 0.7 to 1.5.

The reaction between the urethane prepolymer and the chain-elongation agent is commonly carried out at 20 to 100° C., and preferably at 20 to 50° C.

In addition, the polyurethanes according to the present invention include the urethane prepolymers prepared in the above step (2), in addition to the polyurethanes prepared in the above step (3).

As the aqueous polyurethane resins comprising the polyurethane, those wherein the polyurethane prepared as described above is dissolved or dispersed in water may be given. Examples of methods for dissolving or dispersing the polyurethane in water include a method wherein a urethane prepolymer is prepared, followed by addition of water and an emulsifier or the like if necessary (and furthermore, a reaction with a chain-elongation agent, thus forming a polyurethane). Alternatively, after preparation of the polyurethane, water and an emulsifier or the like if necessary may be added thereto to dissolve or disperse it in water.

The amount of the solid materials in the aqueous polyurethane resins according to the present invention is not particularly restricted, and depends on the uses of the same. It preferably ranges from 30 to 70% by weight.

In addition, for the case where a reaction solvent is employed during a urethane forming reaction or the like, the reaction solvent may be removed after preparation of the polyurethane. Examples of methods for removing the reaction solvent include a method of removing the solvent under reduced pressure at the temperature not higher than that of the boiling point of water, a method of removing the solvent by employing a nitrogen gas or air as a carrier gas, or the like.

The aqueous polyurethane resins according to the present invention exhibit a superior adhesive property, bonding property, weather resistance, water resistance, and the like. For this reason, they are useful for use in coating materials, adhesives, binders, inks, or the like.

In addition, for the case of employing the aqueous polyurethane resins for the uses described above, antioxidants, UV stabilizers, coloring agents, antifoaming agents, fluid adjustors, water repelling agents, agents for imparting lubrication, fillers, or the like may be added to the aqueous polyurethane resins of the present invention, if necessary.

For the case where the aqueous polyurethane resins of the present invention are employed in coating materials, as the coating methods, common methods such as brush coating, spray coating, or the like can be employed, and the hardening condition may be selected from a broad range of drying conditions from drying at ambient temperature to drying with heating. In addition, examples of the materials to be coated include paper, leather, glass, metal, wood, plastics, inorganic raw materials, concrete, asphalt, and the like. The aqueous polyurethane resins of the present invention may be employed as a primer coating agent, an over coating agent, a one-coat finishing agent, or the like. In addition, other resins such as acrylic resins, polyester resins, epoxy resins, silicone resins, fluorine resins, or the like may be added thereto, if necessary.

In addition, for the case where the aqueous polyurethane resins of the present invention are employed for use in adhesives, the hardening condition may be selected from a broad range of drying conditions from drying at ambient temperature to drying with heating. In addition, examples of the materials to be adhered include paper, leather, glass, metal, wood, plastics, inorganic raw materials, concrete, asphalt, and the like.

Furthermore, the aqueous polyurethane resins according to the present invention may be employed for various uses as they are, or may be employed as a two-liquid type composition with a crosslinking agent, if necessary.

Examples of the crosslinking agents include aqueous-type polyisocyanate crosslinking agents (compounds prepared by reacting an isocyanulate such as hexamethylene diisocyanate with a polyhydric alcohol such as polyethylene glycol, or the like; and so on), melamine crosslinking agents (methoxylated methylol melamine and the like), epoxy crosslinking agents (ethylene glycol diglycidyl ether and the like), and the like. The amount of the same is not particularly restricted. The crosslinking agents are preferably employed in an amount of 1 to 40% by weight with respect to the solid materials in the aqueous polyurethane resins.

In the following, Reference Examples, Examples, Comparative Examples, and Test Examples are described.

BEST MODES FOR CARRYING OUT THE INVENTION

REFERENCE EXAMPLE 1

Synthesis of a Polyester Polyol (PEPO) Employing 2,4-diethyl-1,5-pentanediol as a Raw Material In a flask, 5 mol (730 g) of adipic acid and 7.5 mol (1202 g) of 2,4-diethyl-1,5-pentanediol were charged, and were stirred at 500 to 600 rpm and mixed at 200 to 220° C. under a nitrogen atmosphere. While the produced water was removed, a gradual pressure reduction was started when the acid value reached 5 mg KOH/g or less, and was continued until the pressure was 0.4 to 0.65 kPa. Furthermore, when the acid value reached 0.2 mg KOH/g or less and a predetermined hydroxyl group value was obtained at 220° C., stirring was stopped. The mixture was recovered in a vessel, followed by cooling to room temperature, thus producing the desired polyester polyol (PEPO 1).

REFERENCE EXAMPLE 2

Synthesis of a Polyester Polyol Employing 3-methyl-1,5-pentanediol as a Raw Material The procedures similar to those described in Reference Example 1 were carried out, except that 3-methyl-1,5-pentanediol was employed instead of 2,4-diethyl-1,5-pentanediol, thus producing the desired polyester polyol (PEPO 2).

REFERENCE EXAMPLE 3

Synthesis of a Polyester Polyol Employing 1,4-butanediol as a Raw Material

The procedures similar to those described in Reference Example 1 were carried out, except that 1,4-butanediol was employed instead of 2,4-diethyl-1,5-pentanediol, thus producing the desired polyester polyol (PEPO 3).

The values of the molecular characteristics of the PEPOs produced in Reference Examples 1 to 3 are shown in Table 1. Herein, the number average molecular weight (Mn) of each of the PEPOs was calculated according to the equation described below from the hydroxyl group value [OHV (mg KOH/g)] (an end group quantitative method).

$$Mn = 1/(OHV/1000/56.1/2)$$

Mn: number average molecular weight
OHV: hydroxyl group value

TABLE 1

Molecular characteristics of PEPOs according to Reference Examples 1 to 3

| PEPO | Diol employed | Mn |
| --- | --- | --- |
| PEPO 1 | 2,4-diethyl-1,5-pentanediol | 1989 |
| PEPO 2 | 3-methyl-1,5-pentanediol | 2400 |
| PEPO 3 | 1,4-butanediol | 1972 |

EXAMPLE 1

Syntheses of a Urethane Prepolymer and an Aqueous Polyurethane Resin

In a separable flask of 1L volume, 165.4 g of PEPO 1 and 16.9 g of dimethylol butanoic acid (DMBA) were charged. The mixture was heated to 80° C. while being stirred under a nitrogen atmosphere. The mixture was further stirred for 30 minutes while exhaust was carried out by means of a vacuum pump at the same time that nitrogen is provided in the flask. After exhaust by means of the vacuum pump was stopped, the temperature in the flask was lowered to 60° C. Subsequently, 60 g of acetone was added thereto. The temperature was again raised to 80° C., and subsequently, 117.8 g of isophorone diisocyanate (IPDI) was dropwise added thereto over one hour. After completion of adding the drops, the temperature in the flask was maintained at 80° C., and stirring was continued until the conversion of the hydroxyl group in the reaction mixture reached 95% or more. Subsequently, the reaction mixture was cooled to 60° C., and 11.6 g of triethylamine was added thereto to neutralize the carboxyl group in the urethane prepolymer, thus producing the urethane prepolymer.

The conversion of the hydroxyl group in the reaction mixture described above was calculated according to the following equation.

$$\text{Conversion of the hydroxyl group in the reaction mixture} = (1 - A/B) \times 100(\%)$$

A: the number of unreacted hydroxyl groups in the reaction mixture
B: the number of hydroxyl groups in the raw material In a flask, 300 g of the produced urethane prepolymer was charged. Distilled water in an amount of 388 g was portionwise added thereto while being stirred at 3000 to 4000 rpm by means of a homomixer, thus producing an aqueous dispersion of the urethane prepolymer. While stirring by means of the homomixer was continued, 16.1 g of ethylenediamine (EDA) was added to the aqueous dispersion, thus producing the desired aqueous polyurethane resin. The ratio of the solid materials in the above aqueous polyurethane resin was 50.1% by weight, and the viscosity of the same was 480 mPa·s. The ratio of the solid materials was calculated by the following method.

(Method for Calculating the Ratio of the Solid Materials in the Aqueous Polyurethane Resin)

An aqueous polyurethane resin was weighed in an amount of about 1 g. The aqueous polyurethane resin was heated for 2 hours at 105° C. at ambient pressure, and subsequently, the weight of the residue was weighed. The ratio of the solid materials in the aqueous polyurethane resin was calculated according to the following equation.

$$\text{Ratio of solid materials} = C/D \times 100(\%)$$

C: weight of the aqueous polyurethane resin after heating
D: weight of the aqueous polyurethane resin before heating

EXAMPLES 2 AND 3 AND COMPARATIVE EXAMPLES 1 TO 3

The desired aqueous polyurethane resins were produced by carrying out the procedures similar to those described in Example 1 employing the raw materials shown in Tables 2-1 and 2-2.

In Table 2-1, PTG1000 is a product produced by Hodogaya Chemical Co., Ltd. (polyether polyol having Mn=996), and DMPA represents dimethylol propionic acid.

In Table 3, physical properties of the aqueous polyurethane resins produced in each of the Examples and the Comparative Examples are shown.

TABLE 2-1

Copositions of raw materials for aqueous polyurethane resins (1)

| | | | Compound having an acidic group | | |
| --- | --- | --- | --- | --- | --- |
| | PEPO Kind | Amount added (g) | Kind | Amount added (g) | Resin acid value |
| Example 1 | PEPO 1 | 165.4 | DMBA | 16.9 | 20 |
| Example 2 | PEPO 1 | 166.3 | DMPA | 15.4 | 20 |
| Example 3 | PEPO 1 | 152.0 | DMBA | 25.2 | 30 |
| Comparative Example 1 | PEPO 2 | 179.2 | DMBA | 15.1 | 20 |
| Comparative Example 2 | PEPO 3 | 164.8 | DMBA | 16.9 | 20 |
| Comparative Example 3 | PTG1000 | 120.6 | DMBA | 17.9 | 20 |

Unit of the resin acid value is mg KOH/g.

TABLE 2-2

Compositions of raw materials for aqueous polyurethane resins (2)

| | EDA Amount added (g) | IPDI Amount added (g) | Distilled water Amount added (g) |
| --- | --- | --- | --- |
| Example 1 | 16.1 | 117.8 | 388.3 |
| Example 2 | 16.5 | 118.4 | 419.8 |
| Example 3 | 15.3 | 122.8 | 521.5 |
| Comparative Example 1 | 16.9 | 105.7 | 380.7 |
| Comparative Example 2 | 16.0 | 118.3 | 431.6 |

TABLE 2-2-continued

Compositions of raw materials for aqueous polyurethane resins (2)

|  | EDA Amount added (g) | IPDI Amount added (g) | Distilled water Amount added (g) |
|---|---|---|---|
| Comparative Example 3 | 21.5 | 161.5 | 411.8 |

TABLE 3

Physical properties of aqueous polyurethanes

|  | Ratio of solid materials (%) | Viscosity (mPa · s) | pH |
|---|---|---|---|
| Example 1 | 50.1 | 480 | 8.9 |
| Example 2 | 53.7 | 1800 | 9.2 |
| Example 3 | 37.7 | 1230 | 9.8 |
| Comparative Example 1 | 52.0 | 340 | 9.8 |
| Comparative Example 2 | 55.8 | 470 | 9.1 |
| Comparative Example 3 | 56.9 | 690 | 9.1 |

TEST EXAMPLE 1

Evaluation of Aqueous Polyurethane Resins
(1) Preparation of a Polyurethane Film The films for use in measurements of tensile strength and hydrolysis resistance tests were prepared by coating the aqueous polyurethane resins produced in Examples 1, 3, or Comparative Examples 1 to 3 on a glass plate so that the thickness of the film was about 300 μm.

(2) Hydrolysis Resistance Test

The test pieces of the polyurethane film were immersed in hot water at 60° C. for 4 days. Subsequently, the tensile strength of the same was measured. The value of hydrolysis resistance was calculated according to the following equation.

Hydrolysis resistance=$E/F \times 100 (\%)$

E: tensile strength after testing
F: tensile strength before testing

The measurement of the tensile strength was carried out according to JISK 7311.

(3) Adhesive Test

An adhesive test was carried out according to JISK 6804. As the material to be adhered, a birch material (30×25×10 mm) was selected. On an adhesive part of 25×25 mm, 0.125 g of the aqueous polyurethane resin was uniformly coated, and another birch material wherein no aqueous polyurethane resins were applied was adhered thereon. Immediately after that, adherence between them was secured by means of a rubber band. Subsequently, they were maintained in this state for 24 hours at 23° C. Forty-eight hours after the rubber band was removed, the compressive shear strength of the same was measured by means of an Autograph AG-1000 produced by Shimadzu Corporation.

The results of Test Example 1 are shown in Table 4.

TABLE 4

Evaluation results of polyurethane films

|  | Hydrolysis resistance (%) | Adhesive strength (MPa) |
|---|---|---|
| Example 1 | 102 | 8.9 |
| Example 3 | 94 | 8.1 |
| Comparative Example 1 | 87 | 5.8 |
| Comparative Example 2 | 78 | 7.6 |
| Comparative Example 3 | 88 | 3.7 |

From Table 4, it is apparent that the polyurethane resins according to the present invention exhibit a superior water resistance and adhesive property.

Industrial Applicability

According to the present invention, aqueous polyurethane resins are provided which exhibit a superior adhesive property, bonding property, weather resistance, water resistance, and the like, and the polyurethanes for use in these resins.

What is claimed is:

1. A polyurethane comprising in a molecule: an acidic group which is neutralized by a basic compound; and a structural unit represented by general formula (I):

(I)

(in the formula, $R^1$ and $R^2$ are identical or different, and represent a lower alkyl group).

2. The polyurethane according to claim 1, wherein the acidic group is a carboxyl group, a sulfo group, or a phosphono group.

3. The polyurethane according to claim 1, wherein the acidic group is a carboxyl group.

4. The polyurethane according to claim 1, wherein the basic compound is a hydroxide or a carbonate of an alkali metal or an alkaline earth metal, or an organic amine.

5. An aqueous polyurethane resin comprising the polyurethane according to any one of claims 1 to 4.

6. The aqueous polyurethane resin according to claim 5, wherein a weight of solid materials is 30 to 70% by weight.

7. A coating material comprising the aqueous polyurethane resin according to claim 5.

8. An adhesive comprising the aqueous polyurethane resin according to claim 5.

* * * * *